United States Patent [19]

Redner

[11] 3,902,805

[45] Sept. 2, 1975

[54] AUTOMATIC BIREFRINGENCE MEASURING APPARATUS

[75] Inventor: Salomon Redner, Norristown, Pa.

[73] Assignee: Vishay Intertechnology, Inc., Malvern, Pa.

[22] Filed: Sept. 17, 1973

[21] Appl. No.: 398,121

[52] U.S. Cl. .................... 356/33; 250/225; 356/35; 356/115; 356/116; 356/118
[51] Int. Cl.² .................. G01B 11/18; G01N 21/40
[58] Field of Search ......... 356/33, 34, 35, 114, 115, 356/116, 117, 118; 250/225; 350/149

[56] References Cited
UNITED STATES PATENTS

| | | | |
|---|---|---|---|
| 3,373,652 | 3/1968 | Flader | 356/33 |
| 3,520,615 | 7/1970 | Smith | 356/114 |
| 3,649,931 | 3/1972 | Macek | 350/151 |

Primary Examiner—Vincent P. McGraw
Attorney, Agent, or Firm—Roger Norman Coe; Thomas M. Ferrill, Jr.

[57] ABSTRACT

Birefringence resulting from the relative retardation of light waves propagating at different speeds through a stressed plate or coating is measured automatically by splitting a light wave emerging from the stressed plate or coating into at least two beams, filtering each beam with a filter which transmits a different wave length, transforming the light intensity from each filter into electrical signals and using the electrical signals to measure the resulting phase shift which is directly proportional to the birefringence.

12 Claims, 3 Drawing Figures

PATENTED SEP 21975 3,902,805

AUTOMATIC BIREFRINGENCE MEASURING APPARATUS

FIELD OF THE INVENTION

The present invention relates to apparatus for measuring birefringence of stressed material automatically and especially to apparatus capable of making phase measurements for determination of birefringence without requiring the specialized skill of one trained in the art of photoelasticity with respect to determining fringe orders.

BACKGROUND OF THE INVENTION

Photoelasticity, i.e., the property exhibited by some transparent isotropic solids of becoming doubly refracting when subjected to stress, is a valuable property used in experimental stress analysis. Since differences of principal stress can be established at every point in such solids using photoelasticity techniques, such techniques have become increasingly important for establishing design criteria, improving product integrity and reliability, verifying designs for structural safety, and reducing product weight and costs.

Originally, photoelasticity was employed as a tool for the analysis of only flat models being subjected to a plane stress. Even in this simplified form photoelasticity provided valuable information on the overall design criteria of engineering structures since stress concentration factors for typical discontinuities such as holes, notches, and grooves were obtained and compiled in handbooks and design manuals. The process of "stress freezing" in which a three-dimensional model of a structure is (a) cast or machined utilizing a stress free transparent plastic, (b) heated to its softening point, and (c) finally subjected to forces, pressures and other moments such that upon cooling the completed model the pattern of birefringence and deformation is locked in, was a major development transferring photoelasticity into the realm of a tool capable of solving practical engineering problems. A model obtained by stress freezing can be sliced into any number of desired planes and every plane can then be analyzed so as to provide complete three-dimensional stress analysis of the model. The usefulness of photoelasticity as a tool for analysis of stress distributions was further expanded when it was shown that a birefringent material could be bonded as a layer to an actual structure and that the surface strains of the structure would then be transmitted to the coating and could be measured photoelastically.

To understand photoelasticity it is necessary to consider certain fundamentals. It is known, for example, that the index of refraction, $n$, for a transparent homogeneous isotropic material, is equal to the speed of light in a vacuum, $c$, divided by the speed of light in the transparent homogeneous isotropic material, $v$. For such a material the index of refraction is independent of the orientation of any plane of polarized light being transmitted through the transparent material. Although transparent materials, and notably plastics, behave homogeneously when unstressed they become heterogeneous when subjected to stresses or deformation. The index of refraction thus becomes a function of the intensity of stresses applied and the direction of these stresses. It can be shown that when a beam of light, polarized in one plane and propagated through a transparent plate of thickness, $t$, such that the beam crosses the plate at a point containing principal stresses in the $x$ and $y$ directions, the beam of light upon entering the plate will split into two independent wave fronts, or two beams, X and Y, polarized in directions $x$ and $y$. The resulting wave fronts propagate through the plate at different speeds; the speed of propagation of these waves being $v_x$ and $v_y$, respectively. Upon emerging from the plate, one of the two waves will be retarded with respect to the other, and the relative optical retardation, $d$, is shown by the formula: $d = t(n_x - n_y)$. The resulting phase shift, $\phi$, which occurs can be defined as $$\phi = \frac{2\pi d}{\lambda},$$

where $\lambda$ is the wave length of the light used.

Several techniques are employed to measure retardation, the choice depending on the precision needed and also the amount of retardation which occurs. Normally, polariscopes are employed to effect such measurements. The transmission polariscope is used to analyze transparent models or specimens and is also used for the analysis of sliced planes of three-dimensional models. These polariscopes have a light source and a polarizer on one side of the model or specimen and an analyzer on another side of the model or specimen. A reflection polariscope, which employs the principle of double passage of light, is used mainly for photoelastic coatings, but can also be used very efficiently for transparent models. In the case of the reflection polariscope, light which passes through a polarizer is reflected from the model or specimen surface to an analyzer and the sensitivity of measurements is doubled since the light propagates back and forth through the model, thus accumulating twice the retardation.

The polariscope is normally used to establish at each point both the direction of principal stresses or strains and the magnitude or difference of principal stresses and strains. In each of the two typical polariscope arrangements, plane and circular, intensity of light transmitted is a function of the phase shift, $\phi$, resulting from the relative retardation and the relative orientation of principal stresses. For the plane polariscope the intensity of light transmitted becomes zero if the polarizer is parallel to one of the directions of principal stress, $x$ or $y$. This condition is satisfied at several points normally and a line or a complete area will appear black. Such a line or an area is called an isoclinic line. At every point on an isoclinic line the direction of principal stress is either the same as the direction of the polarizer or perpendicular to it. When the polarizer and analyzer are rotated together, the isoclinic line moves to a new position, thus making it possible to completely explore directions of principal stress throughout the part analyzed. By indexing the positions of the polarizer and the analyzer with respect to a reference direction on a convenient scale and graduating the scale in degrees, the angle of stress with respect to the same reference can be read. In order to provide a complete distribution of directions on a large model, the polarizer and analyzer are normally rotated to positions at which the angle of stress equals 0°, 15°, 30°, 45°, 60° and 75° (or some other suitable increment) and the isoclinic lines are placed on a sheet from which a set of isostatic lines can be traced which are parallel to the direction of principal stresses at every point.

It can also be shown that light intensity becomes zero when the relative retardation becomes equal to an integral multiple of the wave length of light used. If monochromatic light is used, a series of black lines are observed. At each point of such a line, which is called isochromatic, retardation d is constant and the integral multiple, N, is the order of the isochromatic or simply the fringe order, where $d = N \lambda$. In order to avoid confusion between isochromatic fringes and isoclinic lines it is desirable normally to observe each separately.

The circular polariscope is similar to the plane polariscope except that it additionally includes a pair of quarter wave plates designed to provide constant retardation of one quarter the wave length of the light used. The purpose of the quarter wave plates is to eliminate sensitivity of the polariscope to the direction of principal stresses. In the case of the circular polariscope where the analyzer is perpendicular to the polarizer (a crossed arrangement), light intensity becomes zero when the relative retardation is equal to an integral multiple of the wave length of light used, If monochromatic light is used, a series of black lines are observed in the crossed polariscope. Along every black line, i.e., isochromatic fringe, the fringe order N remains constant (N = 0, 1, 2, . . . ). Strain and stress fringe values are usually established by calibration. The difference between principal stresses or principal strains can be established at every point once the fringe order N is measured. One of the difficulties in using polariscopes has been the skill required and human evaluation necessary to determine the fringe order, N.

For accurate stress measurements it is necessary to measure retardation to a fraction of the wave length. In order to accomplish this a compensator, such as a crystal or permanently deformed plastic exhibiting a calibrated variable retardation, is introduced according to one technique between the specimen analyzed and the analyzer. The compensator is superimposed so that its principal directions coincide with the directions of principal stresses in the plastic specimen plate. When retardation in the compensator and the measured retardation are numerically equal but opposite in sign total intensity observed is zero. Another technique, the "Tardy" compensation method, is also currently used for obtaining accurate stress measurements. When a point of measurement is located between the orders N and N + 1, rotation of the analyzer by an angle $\alpha$ will move fringes to the point of measurement. As one of the polarizers is rotated the light intensity I expressed as a function of the original light intensity $I_o$ becomes:

$$I = I_o \sin^2 \left( \frac{\pi d}{\lambda} - \alpha \right)$$

These techniques permit fractions of 1/100th of a fringe to be measured, but do not establish the fringe order. Thus, standard methods for isochromatic determination require visual observation of integral fringe orders and a technique such as the Tardy method to determine partial fringe orders. The time and training required to obtain accurate data by such techniques has discouraged many using photoelasticity as a tool for analysis of stress distributions.

It has been suggested that photoelectric devices capable of detecting changes in light intensity and translating those changes into electrical signal might be employed to replace human evaluation. The problem which occurs, however, is the fact that minimum light level will result not only at N = 0 but also at N = 1, 2, . . . and consequently such photoelectric devices are limited to small retardation where d either equals or is less than the wave length.

Another procedure which has been used involves a spinning polarizer method for establishing the ellipticity of light and the position of axes of elliptical light emerging from a birefringent body. The system does eliminate visual intervention of an operator, but the capability of the system is again limited to measurement of small birefringence with retardation equal to or less than the wave length.

SUMMARY OF THE INVENTION

An object of the present invention is to provide apparatus capable of directly determining birefringence and retardation.

Another object of the present invention is to provide apparatus for automatically determining fringe orders.

A further object of the present invention is to provide apparatus for automatically analyzing stress distributions.

Yet another object of the present invention is to provide apparatus which is capable of measuring birefringence automatically even when retardation is many times larger than the wave length employed.

In accordance with the invention, the relative retardation of light waves propagating at different speeds through a stressed plate or coating is measured automatically by splitting light waves emerging from the stressed plate or coating into at least two beams, filtering each beam with a filter which transmits a different wave length, transforming the light intensity from each filter into modulated electrical signals, and measuring phase shift between those electrical signals. In one embodiment the apparatus comprises a model on which birefringence is to be measured, a light source and a polarizer so arranged as to pass polarized light through at least a portion of the model, analyzer means, means for producing periodic modulation of the light intensity passing through the model, beam splitter means for dividing the light from the analyzer into at least two beams, filter means for separately filtering the light divided by the beam splitter and transmitting a different wave length, means for transforming the light intensity from the filters into separate electrical signals, and means for determining phase measurements between the resulting signals. As will be shown, the difference in phase between the signals is proportional to retardation and the birefringence. The resulting phase difference can be displayed by means of a voltmeter, or a digital meter, or can be continuously recorded using oscillograph or the like.

BRIEF DESCRIPTION OF THE DRAWINGS

Other and further objects, advantages and features of the invention will be apparent to those skilled in the art in the following detailed description thereof, taken in conjunction with the accompanying drawings, in which.

DESCRIPTION OF THE PREFERRED EMBODIMENTS

Figure 1:
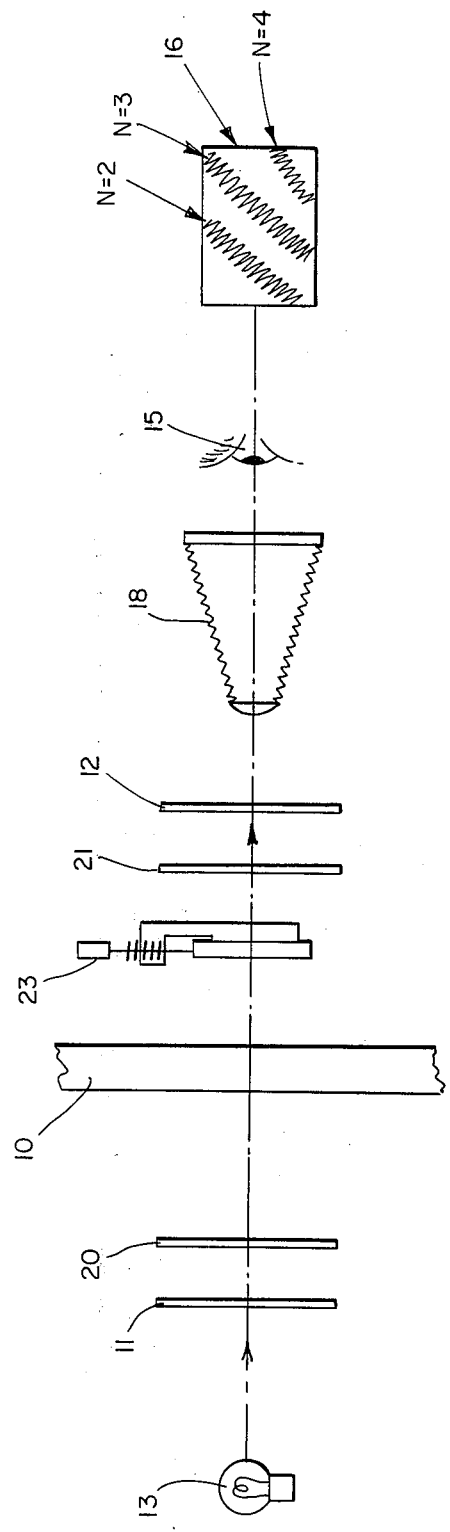
FIG. 1 is a schematic illustration of a typical prior art arrangement of elements for measuring birefringence.

FIG. 1 illustrates a prior art transmission technique for analyzing transparent models and specimens. In such a system the birefringent material 10 is placed between two crossed polarizers 11 and 12, the latter sometimes being referred to as an analyzer. Light from light source 13 propagates toward an observer's eye 15, which can observe the birefringent pattern 16 directly. Alternatively, a camera 18 can be used to record this pattern. The system can further be modified by the introduction of quarter wave plates 20 and 21 which are stressed uniformly in such a way as to exhibit throughout their useful area a constant retardation of one-fourth the wave length of light transmitted from light source 13. The purpose of these quarter wave plates, which can be made from naturally birefringent materials such as mica, is to eliminate sensitivity of polariscopes used to analyze stresses to directions of principal stress. For purpose of explanation, the birefringent pattern 16 which is schematically illustrated shows fringe orders in which $N = 2$, $N = 3$ and $N = 4$. Using white (or polychromatic) light a calibrated adjustable compensator 23 must be used in order to visually adjust the birefringence to match the observed value. The compensator achieves balance by adding calibrated retardation to the retardation to be measured. When birefringence of the compensator is equal and orthogonally oriented to the observed value, the total birefringence of the system becomes zero and visual judgment can be accomplished.

Figure 2A:
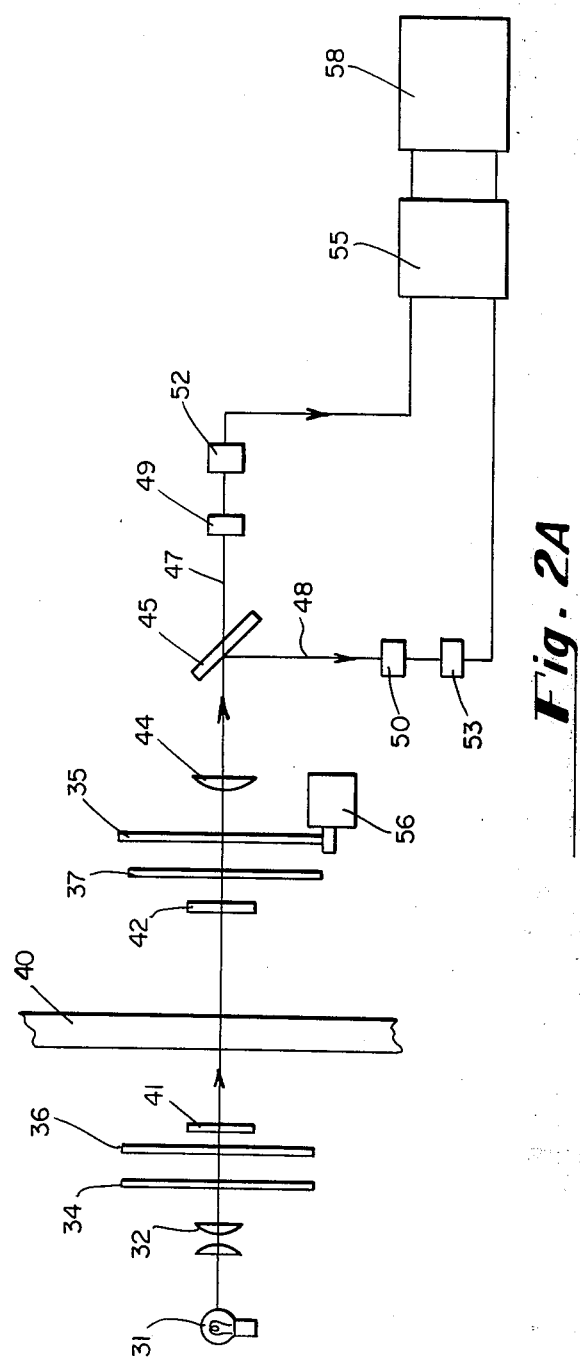
FIGS. 2A and 2B are schematic illustrations of transmission and reflection apparatus arrangements, respectively, for automatically determining birefringence of stressed material in accordance with the present invention.
Figure 2B:
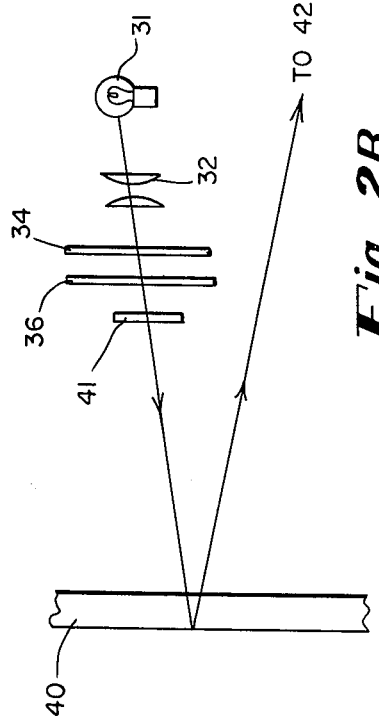

Referring to FIG. 2A, apparatus in accordance with the present invention for automatically measuring birefringence, without intervention of the human eye and without requiring special skill of an operator to recognize or count fringe orders, is illustrated schematically. In this illustration, a suitable light source 31, such as an incandescent light, for producing a polychromatic light is employed. An arrangement of one or more lenses 32 can be incorporated in the system in order to make the most efficient use of the illumination from light source 31. Light propagates through the polariscope consisting of polarizers 34 and 35. Normally, the polariscope also contains quarter wave plates, such as plates 36 and 37. In FIG. 2A, which illustrates a transmission arrangement with respect to the model or specimen 40 under investigation, the elements of the polariscope are mounted on opposite sides of the investigated material or model, as shown. FIG. 2B illustrates an alternative arrangement in which the elements of the polariscope are mounted on only one side of the investigated material. This alternative arrangement is used mainly in connection with photoelastic coatings. For convenience, the two arrangements have been combined in part of the same figure and elements in FIG. 2B which are identical to elements illustrated in FIG. 2A have been given identical numbers. In addition, the relationship of the light transmitted in FIG. 2A and FIG. 2B has been shown by arrows.

It will be understood that in either the reflection or transmission embodiments additional birefringent plates 41 and compensators 42 can be incorporated to adapt the systems to various modes of known operation and techniques.

Light transmitted through polarizer 35 passes through a suitable lens arrangement 44 directing the propagated light to a beam splitter or partial mirror 45 which divides the light into at least two beams. In the drawing two beams, beams 47 and 48, are shown. A filter 49 which transmits light of one wave length $\lambda_1$ is placed in the path of beam 47 while another filter 50, which transmits light of another wave length $\lambda_2$, is placed in the path of beam 48. Photoelectric devices 52 and 53 receive the filtered beams 47 and 48, respectively. These photoelectric devices can be of any suitable form, such as photoresistive cells, which change their resistance as function of light intensity; a photovoltaic cell, which generates a voltage upon illumination; or photomultipliers, manufactured in various configurations, which provide electrical output. Regardless of the nature of the photoelectric devices used, phase meter 55 is provided with two electrical signals, one relating to the light intensity of beam 47 and the other to the light intensity of beam 48.

Suitable means, such as motor 56, is used to achieve modulation of the light intensity emerging from an investigated point. In FIGS. 2A and 2B electric motor 56 causes polarizer 35 to rotate, at a frequency W.

In the operation of the described apparatus, rotation of polarizer 35 in the illustrated embodiments of FIGS. 2A and 2B causes the light intensity emerging from an investigated point to modulate. The light intensity of the beams 47 and 48 for time T become:

$$I_{47} = I_o \sin^2 \left( \frac{\pi d}{\lambda_1} - WT \right)$$

and $$I_{48} = I_o \sin^2 \left( \frac{\pi d}{\lambda_2} - WT \right)$$

and the photoelectric devices 52 and 53 provide electric signals proportional to those light intensities. These signals, which are not necessarily of the same amplitude, exhibit a difference in phase P proportional to the retardation $d$. This difference in phase which can be expressed as:

$$P = P_{47} - P_{48} = \frac{\pi d}{\lambda_1} - \frac{\pi d}{\lambda_2} = d \left( \frac{\pi}{\lambda_1} - \frac{\pi}{\lambda_2} \right)$$

can be measured easily using phase meter 55 and the result of the phase measurement can then be displayed on a suitable device 58, such as a voltmeter, a digital meter, or continuously recorded using an oscillograph.

The beam splitter or partial mirror 45 can take any convenient form. For example, a prism arrangement can be employed for this purpose. While FIG. 2A illustrates a preferred arrangement with respect to beam splitter or partial mirror 45, it will be understood that the beam splitter or partial mirror can be located in any position to the right of model 40 in this figure. For example, the beam splitter could be placed between model 40 and compensator 42. Obviously, the system of the present invention is not limited to splitting a light beam into only two beams, but can be used for splitting the light beam into multiple beams. For most applications, however, two beams are sufficient for measuring birefringence ($n_x 31\ n_y$). It will be understood that suitable modulation can be obtained by rotating either of the polarizers, 34 and 35, or if desired birefringent plate 41. Instead of a motor 56, a vibrator or other suitable means can be employed. According to anther modification of the invention, electrical means, such as an electromagnetic field, is used to excite the birefringent plate and product modulation of that plate. The filters employed can be designed to transmit any suitable wave lengths; the wave length transmitted by each filter being different. A suitable electrical phase meter for the invention is the Wiltron Model 355 digital phase meter.

From the foregoing, it will be seen that this invention is adapted to obtain all of the ends and objects hereinabove set forth, together with other advantages which are obvious and inherent. The ability to make birefringent measurements without specialized training represents a significant development for expanding the usefulness of photoelasticity as a tool for analysis of stress.

Obviously, many modifications and variations of the invention as hereinbefore set forth can be made without departing from the spirit and scoep thereof and therefore only such limitations should be imposed as are indicated by the appended claims.

What is claimed is:

1. Apparatus for measuring birefringence, which apparatus comprises a light source, polarizer and quarter wave plates so arranged as to pass polarized light through at least a portion of a model on which birefringence is to be measured, analyzer means comprising another polarizer, means for producing periodic modulation of light intensity passing through the model, beam splitter means for dividing the light passing through the model into at least two beams, narrow pass filter means for separately filtering the light divided by the beam splitter and transmitting a different wave length through each filter, means for transforming the light intensity from each filter into electrical signals, and means for determining phase measurements between the resulting signals.

2. Apparatus for measuring birefringence as in claim 1 in which the means for producing periodic modulation of the light intensity passing through the model comprises a motor which rotates the polarizer.

3. Apparatus for measuring birefringence as in claim 1 in which the means for producing periodic modulation of the light intensity passing through the model comprises a birefringent plate modulated by periodic changes in its birefringence.

4. Apparatus for measuring birefringence as in claim 3 in which the birefringent plate is modulated by an electrical signal.

5. Apparatus for measuring birefringence as in claim 1 in which the beam splitter is a partial mirror.

6. Apparatus for measuring birefringence as in claim 1 which further includes means for displaying phase measurements obtained.

7. Apparatus for measuring birefringence, which apparatus is to be used in conjunction with a circular polariscope and comprises beam splitter means for dividing light which is passed through a birefringent member in the circular polariscope into at least two beams; means for producing periodic modulation of the light intensity passing to the beam splitter; narrow pass filter means for separately filtering light divided by the beam splitter and transmitting a different wavelength; means for transforming the light from the filter means into separate electrical signals; and means for determining phase measurements between the resulting signals.

8. Apparatus for measuring birefringence as in claim 7 in which the polariscope is a transmission polariscope.

9. Apparatus for measuring birefringence as in claim 7 in which the polariscope is a reflection polariscope.

10. Apparatus for measuring birefringence as in claim 7 in which the means for producing periodic modulation of the light intensity is a birefringent plate modulated by an electromagnetic field.

11. Apparatus for measuring birefringence, which apparatus is to be used in conjunction with a polariscope and comprises beam splitter means for dividing the light from the analyzer of the polariscope into at least two beams, said light having passed through a specimen to be analyzed; means for producing periodic modulation of the light intensity passing to the beam splitter; narrow pass filter means for separately filtering light divided by the beam splitter and transmitting a different wave length from each filter means; means for transforming the light from each filter means into separate electrical signals; and means for determining phase measurements between the resulting electrical signals.

12. Apparatus for measuring birefringence, which apparatus comprises a light source, polarizer and quarter wave plates so arranged as to pass polarized light through at least a portion of a model on which birefringence is to be measured, analyzer means comprising another polarizer, means for producing periodic modulation of light intensity passing through the model, beam splitter means for dividing only light passing through the model into at least two beams, narrow pass filter means for separately filtering the light divided by the beam splitter and transmitting a different wave length through each filter, means for transforming the light intensity from each filter into electrical signals, and means for determining phase measurements between the resulting signals.

* * * * *